United States Patent [19]

Caviar

[11] Patent Number: 5,335,688
[45] Date of Patent: Aug. 9, 1994

[54] VARIABLE PRESSURE REGULATING VALVE SYSTEM

[75] Inventor: Robert A. Caviar, Leawood, Kans.

[73] Assignee: Imperial Underground Sprinkler Co., Lenexa, Kans.

[21] Appl. No.: 38,227

[22] Filed: Mar. 29, 1993

[51] Int. Cl.$^5$ ............................................. F16K 31/128
[52] U.S. Cl. ............................................ 251/26; 251/45
[58] Field of Search ................................... 251/26, 45

[56] References Cited

U.S. PATENT DOCUMENTS

| | | | |
|---|---|---|---|
| 2,635,634 | 4/1953 | Thurber | 251/26 |
| 3,282,552 | 11/1966 | Sommese | 251/26 |
| 3,346,004 | 10/1967 | Costello | 251/26 X |
| 4,991,625 | 2/1991 | Manganaro | 251/26 X |

*Primary Examiner*—Robert G. Nilson
*Attorney, Agent, or Firm*—Litman, McMahon & Brown

[57] ABSTRACT

A pressure-regulating valve system includes a valve body assembly having inlet, outlet and control chambers. A flow valve assembly includes a diaphragm gasket which movably mounts a valve member. The valve member is movable between a closed position, a full flow open position and two pressure-regulating positions intermediate its closed and full flow positions. A full flow bypass valve assembly selectively communicates the control chamber and the outlet chamber for relieving the fluid pressure in the control chamber whereby the flow valve moves to its full flow open position communicating the inlet and outlet chambers. A pressure regulating subsystem includes multiple pressure regulating modules each having a solenoid-actuated valve and a pressure adjustable valve. The pressure regulating modules are connected in parallel relationship to inlet and outlet manifolds which fluidically communicate with the control and outlet chambers respectively. Selectively actuating the pressure regulating modules positions the flow valve in its respective pressure regulating positions whereby the valve system output is pressure regulated.

16 Claims, 2 Drawing Sheets

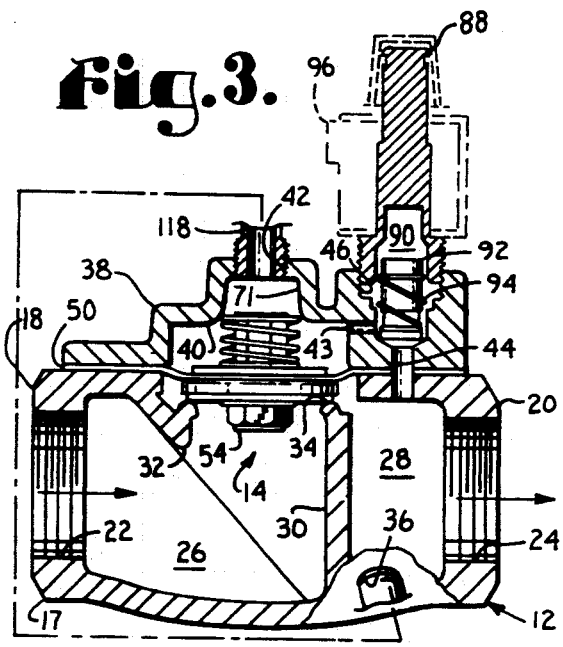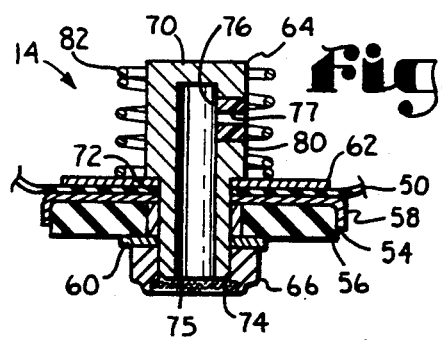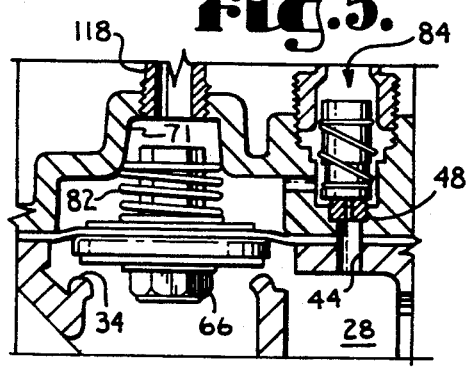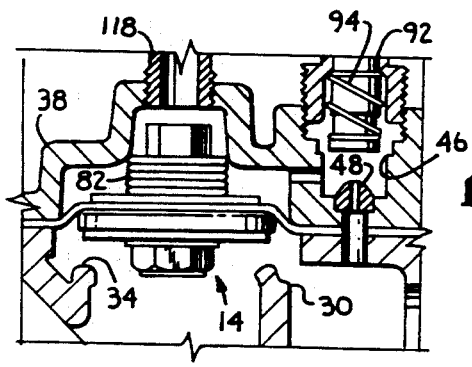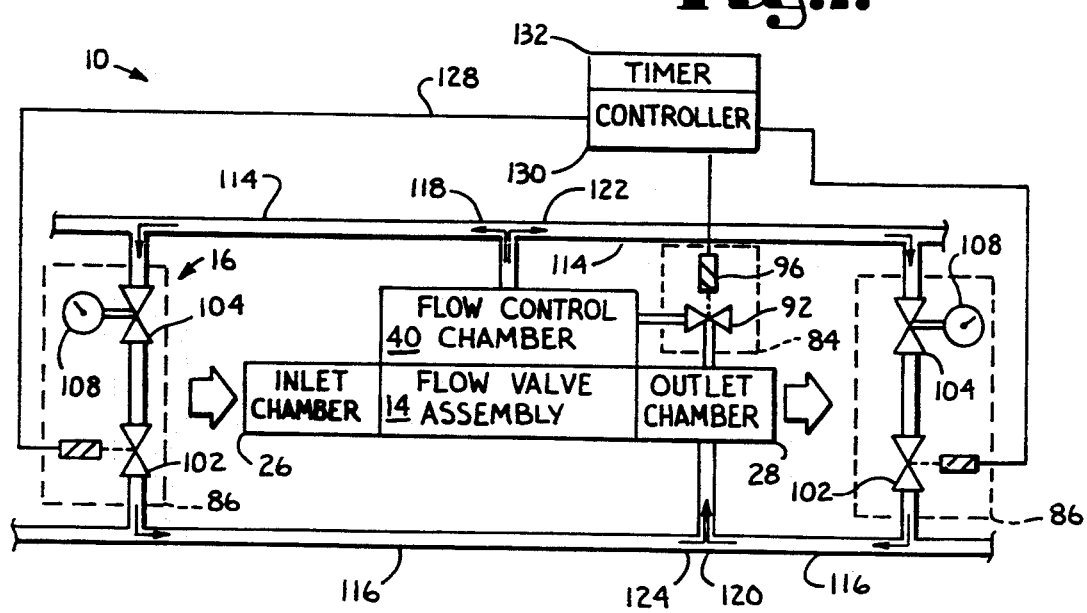

VARIABLE PRESSURE REGULATING VALVE SYSTEM

BACKGROUND OF THE INVENTION

1. Field of the Invention

The present invention relates generally to valves, and in particular to a valve system with full flow and multiple pressure regulating positions.

2. Description of the Related Art

Various valve systems have heretofore been proposed for controlling the flow of different types of fluids. Such valve systems can be actuated manually or automatically, and typically have open and closed positions for respectively permitting and blocking fluid flow therethrough.

Previous valve systems have utilized fluid pressure differentials to control their opening and closing movements. For example, pressure regulating valves are available with valve members which are controlled in this manner. Such valves are retained in their closed positions by fluidically connecting control and inlet chambers thereof whereby greater areas of their valve members are exposed to fluid pressures in the inlet chambers. The valve opening sequence in such a system can be initiated by opening the control chamber to the valve outlet side, thus lowering the pressure within the control chamber whereby the valve member is moved to its open position by greater fluid pressure in the inlet chamber.

It is often desirable to regulate the outlet pressure of a system for dispensing water or other liquids so that consistent pressure is maintained for use in a system located downstream from a pressure regulating valve system. Multiple regulated pressures are sometimes preferred. Different water pressures may be called for by various conditions. For example, an irrigation system may utilize different water pressures for accommodating different sprinkler networks and for providing irrigation coverage over different areas of different sizes. Another example of an installation wherein multiple pressure regulating valves could be utilized is in a vehicle washing facility where different water pressures may be required for, e.g., the wash, rinse and wax cycles.

Matching the outlet pressure to the requirements for a particular task can be important for purposes of water conservation. In many parts of the country potable water supplies are in scare supply and subject to ever-increasing demands. This situation has resulted in strict water usage controls and rationing in some parts of the country, limitations on permits for new water hookups, and higher water rates. Efficient utilization of water resources has thus assumed greater importance in many areas, and has become an important factor in controlling costs among businesses which utilize large quantities of water, e.g., for irrigation, washing, etc.

Valve systems have heretofore been available which provided for flow rate adjustments. For example, valve assembly handles have been provided which can be turned through ranges of motion to vary the outputs. Also, valve systems have been provided with controls which utilize relays, solenoids and the like for remote actuation. Pressure regulating valve systems have also been available which have full flow and pressure regulated positions. However, heretofore there has not been available a variable pressure regulating valve system with the advantages and features of the present invention.

SUMMARY OF THE INVENTION

In the practice of the present invention, a variable pressure regulating valve system is provided which includes a body assembly having inlet and outlet chambers fluidically separated by a flow valve assembly having a closed position, a full flow open position, and first and second pressure regulating positions intermediate the closed and full flow open positions. The body assembly forms a flow control chamber which is partially enclosed by the flow valve assembly. The flow control chamber communicates with the inlet chamber and is selectively fluidically coupled to the outlet chamber by a full flow bypass valve and by multiple pressure regulating modules, which can be selectively and individually actuated by a controller through a series of solenoids which open the respective valves. The pressure regulating modules are fluidically connected to the flow control chamber and the outlet chamber by inlet and outlet manifolds respectively, which can mount a number of such pressure regulating modules, each of which can be set for a different outlet pressure and independently actuated by the controller.

OBJECTS AND ADVANTAGES OF THE INVENTION

The principle objects and advantages of the present invention include: providing a variable pressure regulating valve system; providing such a system which provides full flow and multiple pressure regulating operating conditions; providing such a valve system which can facilitate the efficient utilization of water resources; providing such a valve system which can be controlled from a remote location; providing such a valve system which includes an automatic controller; providing such a valve system which is adapted for providing a number of operating conditions at different outlet pressures; providing such a valve system which can be assembled from readily available components in multiple configurations; providing such a valve system which is economical to manufacture, efficient and reliable in operation, capable of a long operating life and particularly well adapted for the proposed usage thereof; and providing such a valve system which is compatible with various water systems.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a vertical, cross-sectional view of the valve system taken generally along line 3—3 in FIG. 2.

FIG. 4 is an enlarged, fragmentary, vertical, cross-sectional view of the valve system, particularly showing a flow valve assembly thereof.

FIG. 5 is an enlarged, fragmentary, vertical, cross-sectional view of the valve system, particularly showing the flow valve assembly in a pressure regulating position thereof and a full flow bypass valve in a closed position thereof.

FIG. 6 is an enlarged, fragmentary, vertical, cross-sectional view of the valve system, particularly showing the flow valve assembly in a full flow position thereof and the full flow bypass valve in an open position thereof.

FIG. 7 is a schematic diagram of the valve system.

DETAILED DESCRIPTION OF THE PREFERRED EMBODIMENTS

I. Introduction and Environment

Figure 1:
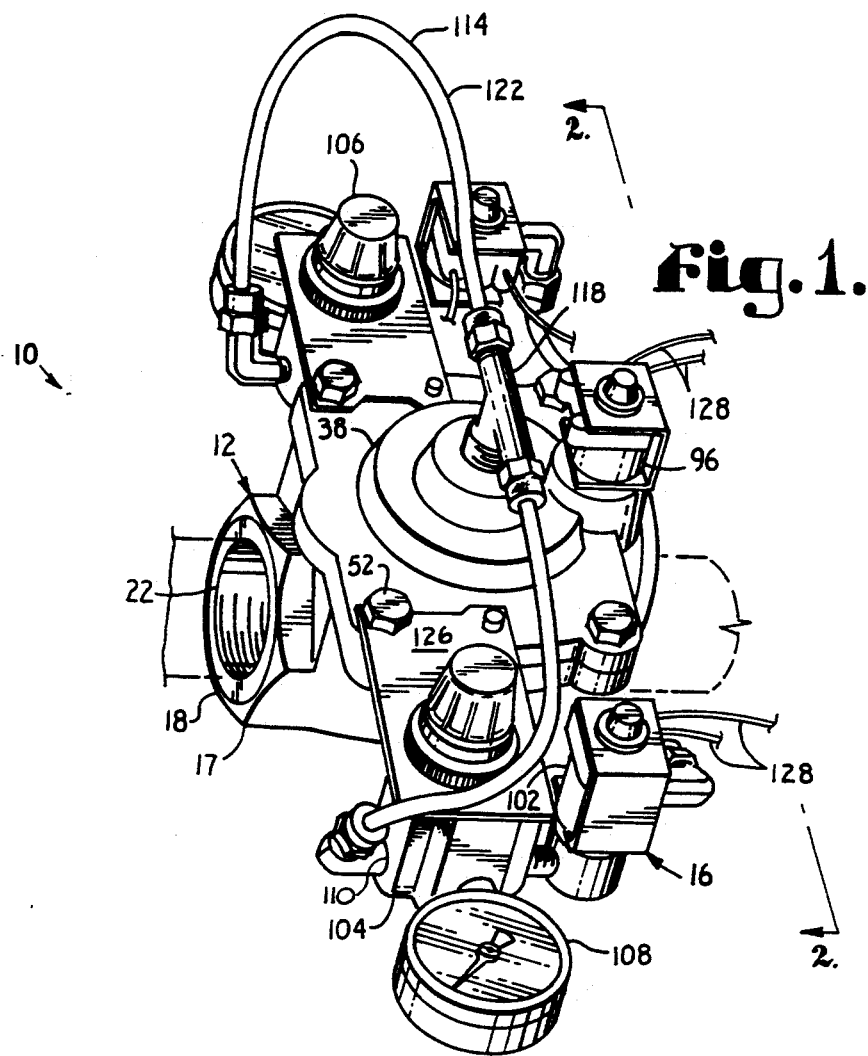
FIG. 1 is perspective view of a valve system embodying the present invention, as viewed from an upstream or inlet end thereof.
Figure 2:
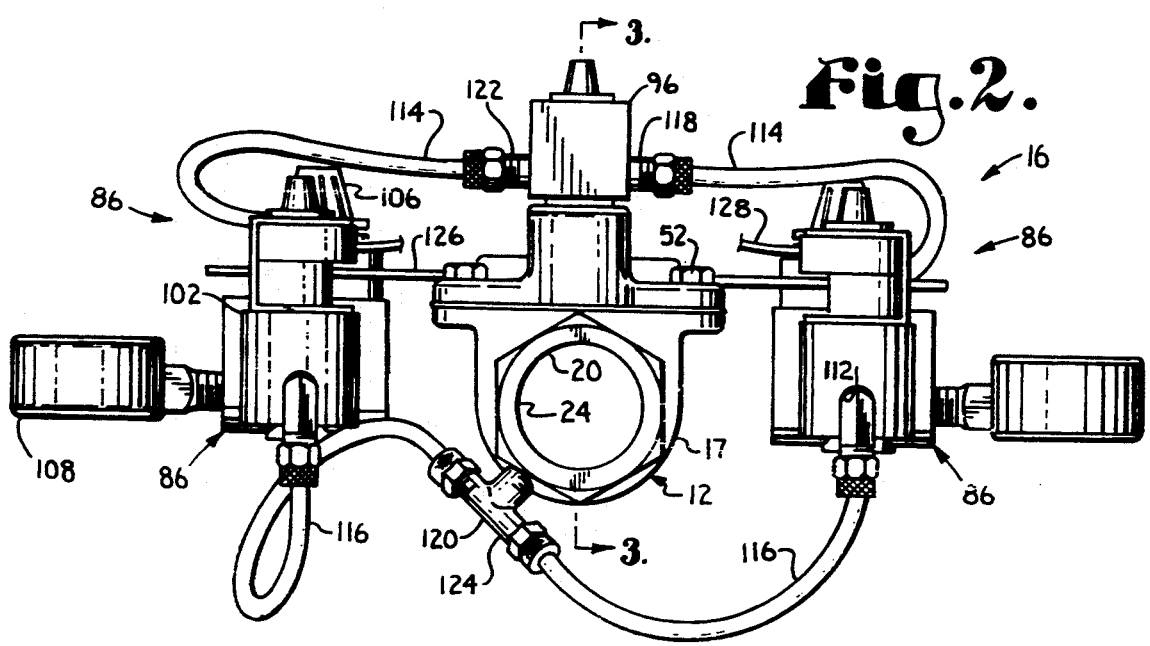
FIG. 2 is an end elevational view of the valve system taken generally along line 2—2 in FIG. 1.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 10 generally designates a pressure regulating valve system embodying the present invention. The valve system 10 generally comprises a body assembly 12, a flow valve assembly 14 and a pressure regulating subsystem 16.

II. Body Assembly 12

The body assembly 12 includes a valve body 17 having inlet and outlet ends 18, 20 and inlet and outlet openings 22, 24 open respectively thereat and communicating with inlet and outlet chambers 26, 28. A body partition 30 separates the inlet and outlet chambers 26, 28 and is convex in a downstream direction. The inlet and outlet openings 22, 24 can be female-threaded as shown, male-threaded or plain.

A flow passage 32 is formed between the inlet and outlet chambers 26, 28 and includes an annular valve seat 34 located generally on top of the body partition 30. The body 17 includes a pressure regulating bypass downstream opening 36 fluidically communicating with its outlet chamber 28. The opening 36 can be formed by drilling and tapping into the body 17.

A bonnet 38 is mounted on the body 17 and forms a flow control chamber 40 positioned generally over the valve seat 34. The bonnet 38 includes a pressure regulating bypass upstream opening or port 42, which can be female-threaded (FIG. 5) and is generally centered over the valve seat 34 in communication with the control chamber 40. The bonnet 38 further includes a full flow bypass port 43 communicating with the control chamber 40 and extending in a generally downstream direction therefrom to a full flow bypass valve pocket 46 positioned generally over the outlet chamber 28. A full flow bypass passage 44 extends from the valve pocket 46 to the outlet chamber 28 and is encircled by a full flow bypass valve seat 48. The full flow bypass passage 44 extends through the bonnet 38, the body 17 and a diaphragm gasket 50 positioned therebetween. The bonnet 38 can be mounted on the body 17 by suitable mounting bolts 52, which clamp the diaphragm gasket 50 therebetween. The diaphragm gasket 50 can comprise a suitable flexible, elastomeric material.

The body assembly 12 can generally be comprised of cast bronze, molded plastic or other suitable material. A body assembly 12 comprising two pieces, i.e., the body 17 and the bonnet 38, is shown and described herein. However, the body assembly 12 could comprise other materials and assume other configurations.

III. Flow Valve Assembly 14

The flow valve assembly 14 comprises a valve member subassembly 54 including an elastomeric sealing washer 56 mounted on the upstream side of the subassembly 54 and partly received within a valve member cap 58. Upstream and downstream washers 60, 62 are provided for securing the valve member subassembly 54 in place on the upstream side of the diaphragm gasket 50 in conjunction with a hollow flow valve stud 64 threadably mounting a nut 66 on its open lower end in engagement with the upstream washer 60 and having a larger-diameter downstream end 70 engaging the downstream washer 62 with a shoulder 72. The stud 64 has an open upstream end 74 which receives a screen 75 with multiple openings each having a maximum width of, for example, about 0.020 inches.

The stud 64 also includes a bore 76 extending in a downstream direction from the stud upstream end 74 and terminating at a stud downstream or outlet opening or orifice 77 having a greater diameter than the width of the screen openings, e.g., in the range of about 0.028 to 0.039 inches. The downstream opening or orifice 77 can be formed in a removable inset 80 whereby the stud 64 can be equipped with orifices of different sizes for adjusting the closing rate of the flow valve assembly 14. A return spring 82 engages the bonnet 38 within the flow control chamber 40 and also engages the downstream washer 62. The flow control chamber 40 has a recess 71 formed in the bonnet 38 which receives the stud downstream end 70 when the flow valve assembly 14 opens.

IV. Pressure Regulating Subsystem 16

The pressure regulating subsystem 16 variably controls the operation of the flow valve assembly 14 by means of a full flow bypass or pilot valve 84 and a plurality (e.g., two are shown) of pressure regulating modules 86.

The bypass valve 84 includes a solenoid mounting shaft 88 mounted on the bonnet 38 coaxially with the seat 48 and having a bore 90 which opens into the valve pocket 46 and receives a reciprocating bypass valve member 92 and a return spring 94 therefor. A full flow solenoid 96 is mounted on the solenoid mounting shaft 88 and disengages the valve member 92 from the bypass valve seat 48 when actuated. When the full flow solenoid 96 is deactivated, the return spring 94 returns the valve member 92 to a closed position engaging the bypass valve seat 48.

Each pressure regulating module 86 includes a solenoid-actuated valve 102 fluidically coupled with a valve 104 which is adjustable by means of a pressure control knob 106. The valve 104 mounts a pressure gauge 108. The pressure-adjustable valve 104 includes an inlet port for the pressure regulating module 86 and the solenoid-actuated valve 102 includes an outlet port 112 therefor.

Each pressure regulating module 86 includes inlet and outlet conduits 114, 116 fluidically connected to respective inlet and outlet ports 110, 112 and to the flow control chamber 40 and the outlet chamber 28 respectively by inlet and outlet T-connectors 118, 120. The inlet conduits and T-connectors 114, 118 and the outlet conduits and T-connectors 116, 120 collectively form inlet and outlet manifolds 122, 124 respectively.

The pressure regulating modules 86 are mounted on the body assembly 12 by means of mounting plates 126 which can be fastened (e.g., by bolting) to the bonnet 38 and extended therefrom for mounting the pressure-adjusting valves 104. However, other suitable mounting means can be employed, for example, by incorporating the entire valve system 10 in a suitable enclosure or cabinet (not shown).

The full-flow solenoid 96 and the solenoid-actuated valves 102 are electrically coupled by suitable electrical wiring 128 to a controller 130, which can include timer means 132.

Although two pressuring regulating modules 86 are shown, additional pressure regulating modules could be connected to the inlet and outlet manifolds 122, 124 to provide a wide range of pressure regulating control for the valve system 10. As shown in the schematic diagram (FIG. 7) of the system, the pressure regulating modules 86 are connected in a parallel relationship in the valve system 10 whereby additional pressure regulating modules could also be connected in parallel relationship.

V. Operation

In operation, the valve system 10 can be operated at either of two predetermined outlet pressures or at full flow.

In a closed position of the valve system 10 (FIG. 3), the flow valve assembly 14 is held closed by a fluid force differential acting thereacross. With the valve assembly 14 closed, the inlet chamber 26 communicates with the control chamber 40 through the hollow stud 64 whereby fluid pressure tends to be equalized therebetween. The flow valve assembly 14 is maintained in a closed positioned by such equalized fluid pressure because a considerably larger area (e.g., about two and one-half times as large in a preferred configuration) of the valve member subassembly 54 is exposed to and acted upon by the fluid pressure in the flow control chamber 40 than in the inlet chamber 26. Thus, with the fluid pressure substantially equal between the inlet chamber 26 and the flow control chamber 40, the valve sealing washer 56 is firmly engaged with the valve seat 34 in a substantially fluid-tight engagement and the valve system 10 is closed.

The flow valve assembly 14 is moved to one of its several open positions by fluidically communicating the outlet chamber 28 and the flow control chamber 40. The outlet pressure or outlet rate is determined by the relative sizes of the bypass passages which are open to place the valve assembly 14 in its different regulated and full flow operating conditions.

The full flow configuration is shown in FIG. 6 and comprises the full flow bypass valve 84 being open to communicate the outlet and flow control chambers 28, 40 through the full flow bypass port, passage and seat 43, 44 and 48. The resulting drop in fluid pressure in the fluid control chamber 40 causes the flow valve assembly 14 to lift from the valve seat 34 for maximum flow from the inlet chamber 26 to the outlet chamber 28. The diaphragm gasket 50 fluidically separates the inlet and control chambers 26, 40 and flexes to permit movement of the valve member subassembly 54, which movement is also controlled by the return spring 82.

A pressure regulated flow condition is shown in FIG. 5 whereby one of the pressure regulating modules 86 is actuated and communicates the outlet and control chambers 28, 40 through a preset restricted passage in a respective pressure adjustable valve 104. A substantially uniform output pressure is achieved in this manner. Reduced outlet pressure can be achieved by further restricting the passage through the pressure adjustable valve 104 of the actuated pressure regulating module 86. Thus, a number of pressure regulating modules 86 can be linked in parallel relationship between the inlet and outlet manifolds 122, 124 and can be selectively actuated singly or in groups to achieve desired outlet pressures.

The flow valve assembly 14 is adapted for automatic closure upon the closure of whichever of the bypass valve 84 or the pressure regulating modules 86 is open. The fluid pressures in the inlet and control chambers 26, 40 will thus be equalized by fluid flow through the flow valve stud 64, which returns the valve member subassembly 54 to its closed position, assisted by the return spring 82. The closure rate of the flow valve assembly 14 depends at least partly on the size of the stud outlet opening 77. Multiple insets 80 with stud outlet openings having different diameters can be interchangeably mounted in the stud downstream end 70 for controlling the valve assembly 14 closure rate. By way of example, an outlet opening 77 with a diameter of approximately 0.039 inches can be provided for normal operation, and an outlet opening 77 with a diameter of approximately 0.028 includes can be provided for a slower closure rate.

The openings, passages and orifices in the valve system 10 can be sized to reduce problems associated with clogging by particles of debris and other foreign matter. Thus, the openings become progressively larger in a downstream projection whereby particles which pass through the screen 75 with openings which measure, e.g., 0.020 inches across will easily pass through the stud outlet opening 77 with a diameter of, e.g., in the range of about 0.028 inches to 0.039 inches and will also pass through the full flow bypass passage 44 which can have a diameter of, e.g., 0.093 inches.

The controller 130 can be manual or automatic, and can include suitable computer or microprocessor means for automatically controlling the operation of the valve system 10 in response to preprogrammable conditions, such as predetermined time intervals, demand for water flow or a water level in a vessel located downstream of the valve system 10. The controller 130 can include timer means 132 for changing the flow rate through valve system 10 at predetermined time intervals. For example, the valve system 10 could be installed in a facility for washing vehicles whereby different water pressures could be matched with the requirements in different phases of a wash cycle, e.g., a wash phase at full flow and final rinse and wax phases at discrete, predetermined regulated pressures. Matching the outlet pressure to the optimum pressure for a particular task in this manner can conserve water by making the most efficient use of the water available.

It is to be understood that while certain forms of the present invention have been illustrated and described herein, it is not to be limited to the specific forms or arrangement of parts described and shown.

What is claimed and desired to be secured by Letters Patent is as follows:

1. A pressure regulating valve system, which comprises:
   (a) a body assembly including:
      (1) an inlet chamber;
      (2) an inlet opening communicating with the inlet chamber;
      (3) an outlet chamber;
      (4) an outlet opening communicating with the outlet chamber;
      (5) a control chamber having a pressure regulating bypass opening and a full flow bypass port fluidically communicating therewith;
      (6) a valve body including the inlet and outlet chambers and a valve partition separating same;
      (7) a bonnet mounted on said valve body and including said control chamber generally located over said inlet chamber and a full flow bypass valve pocket generally located over said outlet chamber, said full flow bypass port communicating with said bypass valve pocket;
      (8) a full flow bypass passage extending from said valve pocket to said outlet chamber and a full flow bypass valve seat surrounding said bypass passage; and
      (9) a flow passage selectively communicating said inlet and outlet chambers and including a flow valve seat located generally below said control chamber;
   (b) a flow valve assembly including:
      (1) an elastomeric, flexible diaphragm gasket mounted between said valve body and said bonnet;
      (2) a valve member including:
         (i) a valve member cap having a configuration which is generally concave in an upstream direction;
         (ii) a sealing washer generally positioned in said valve member cap;
         (iii) a flow valve stud having an upstream end positioned in said inlet chamber and a downstream end positioned in said control chamber;
         (iv) a flow valve stud bore extending from said stud upstream end to a position in proximity to said stud downstream end;
         (v) and inlet screen with openings covering said stud bore at said stud upstream end and a removable inset mounted in said stud in proximity to the downstream thereof, said inset having an inset orifice fluidically communicating with the stud bore; and
         (vi) said stud extending through said diaphragm gasket, said valve member cap and said sealing washer;
      (3) a closed position with said sealing washer engaging said valve seat, a full flow position with said valve member in spaced relation from said valve seat, and first and second pressure regulating positions intermediate said closed and full flow positions; and
      (4) a return spring engaging said bonnet and said valve member for urging said valve member towards its closed position;
   (c) a full flow bypass valve including:
      (1) a full flow bypass valve member mounted generally within said full flow bypass valve pocket and movable between a closed position engaging said full flow bypass valve seat and an open position in spaced relation therefrom; and
      (2) a solenoid magnetically coupled to said full flow bypass valve member for moving same between its open and closed positions;
   (d) an inlet T-connector mounted on said bonnet in fluidic communication with said control chamber;
   (e) an outlet T-connector mounted on said valve body in fluidic communication with said outlet chamber;
   (f) first and second pressure regulating modules each including:
      (1) an inlet conduit fluidically connected to said inlet T-connector;
      (2) an outlet conduit fluidically connected to said outlet T-connector;
      (3) a pressure adjusting valve fluidically connected to said inlet conduit;
      (4) a pressure gauge fluidically connected to said pressure adjustable valve; and
      (5) a solenoid-actuated pressure regulating valve fluidically connected to said pressure adjustable valve and to said outlet conduit;
   (g) a controller including means for selectively actuating said full flow bypass valve assembly solenoid and said pressure regulating module solenoid-actuated valves;
   (h) timer means connected to said controller for sequentially controlling said full flow bypass and pressure regulating valves pursuant to a predetermined sequence and timing; and
   (i) said valve stud downstream orifice having a greater cross-sectional dimension than a cross-sectional dimension of said screen openings and said full flow bypass valve passage having a greater cross-sectional dimension than said valve stud inset orifice.

2. A pressure regulating valve system, which comprises:
   (a) a body assembly including an inlet chamber with an inlet opening communicating therewith, an outlet chamber with an outlet opening communicating therewith and a control chamber having a pressure regulating bypass opening and a full flow bypass port communicating therewith;
   (b) a flow passage selectively communicating said inlet and outlet chambers and including a flow valve seat;
   (c) a flow valve assembly including a valve member movable between a closed position engaging said flow valve seat, a full flow position in spaced relation from said flow valve seat, and first and second pressure regulating positions intermediate said closed and full flow positions;
   (d) full flow bypass means including:
      (1) a full flow bypass valve having an open position communicating said control and outlet chambers and a closed position; and
      (2) a full flow valve actuator selectively moving said full flow bypass valve between the open and closed positions thereof;
   (e) first pressure regulating bypass means including:
      (1) a first pressure regulating bypass valve having an open position communicating said control and outlet chambers and a closed position;
      (2) a first pressure regulating bypass valve actuator selectively moving said first pressure regulating bypass valve between the open and closed positions thereof; and (f) second pressure regulating bypass means including:
  (1) a second pressure regulating bypass valve having an open position communicating said control and outlet chambers and a closed position; and
  (2) a second pressure regulating bypass valve actuator selectively moving said second pressure regulating bypass valve between the open and closed positions thereof;
(g) said body assembly includes a full flow bypass passage selectively, fluidically communicating said control and outlet chambers with said full flow bypass valve in its open position;
(h) a screen mounted on said flow valve stud upstream end and having multiple passages;
(i) a removable inset mounted in said flow valve stud in proximity to the downstream end thereof and having an orifice fluidically communicating with said flow valve stud bore; and
(j) said inset orifice having a greater width than said screen openings and said full flow bypass passage having a greater width than said inset orifice.

3. The invention of claim 2 wherein:
(a) each said pressure regulating bypass means includes a pressure adjustable valve.

4. The invention of claim 3 wherein each said pressure regulating bypass means includes:
(a) said bypass valve and said pressure adjustable valve thereof being connected in series;
(b) a gauge mounted on said pressure adjustable valve in fluidic communication therewith; and
(c) said first and second pressure regulating bypass means being fluidically connected to said control and outlet chambers in parallel relation with respect to each other.

5. The invention of claim 2 which includes:
(a) automatic control means automatically controlling said bypass valve actuators.

6. A pressure regulating valve system, which comprises:
(a) a body assembly including an inlet chamber with an inlet opening communicating therewith, an outlet chamber with an outlet opening communicating therewith and a control chamber having a pressure regulating bypass opening and a full flow bypass port communicating therewith;
(b) a flow passage selectively communicating said inlet and outlet chambers and including a flow valve seat;
(c) a flow valve assembly including a valve member movable between a closed position engaging said flow valve seat, a full flow position in spaced relation from said flow valve seat, and first and second pressure regulating positions intermediate said closed and full flow positions;
(d) full flow bypass means including:
  (1) a full flow bypass valve having an open position communicating said control and outlet chambers and a closed position; and
  (2) a full flow valve actuator selectively moving said full flow bypass valve between the open and closed positions thereof;
(e) first pressure regulating bypass means including:
  (1) a first pressure regulating bypass valve having an open position communicating said control and outlet chambers and a closed position; and
  (2) a first pressure regulating bypass valve actuator selectively moving said first pressure regulating bypass valve between the open and closed positions thereof;
(f) second pressure regulating bypass means including:
  (1) a second pressure regulating bypass valve having an open position communicating said control and outlet chambers and a closed position; and
  (2) a second pressure regulating bypass valve actuator selectively moving said second pressure regulating bypass valve between the open and closed positions thereof;
(g) an upstream end located in said inlet chamber;
(h) a downstream end located in said control chamber;
(i) a flow valve stud bore open at said flow valve stud upstream end and open in proximity to said flow valve stud downstream end;
(j) a valve member cap with a configuration which is generally concave in an upstream direction and a sealing washer mounted within said valve member cap and engaging said flow valve seat with said flow valve in its closed position; and
(k) said flow valve stud extending through said valve member cap and sealing washer.

7. A pressure regulating valve system, which comprises:
(a) a body assembly including an inlet chamber with an inlet opening communicating therewith, an outlet chamber with an outlet opening communicating therewith and a control chamber having a pressure regulating bypass opening and a full flow bypass port communicating therewith;
(b) a flow passage selectively communicating said inlet and outlet chambers and including a flow valve seat;
(c) a flow valve assembly including a valve member movable between a closed position engaging said flow valve seat, a full flow position in spaced relation from said flow valve seat, and first and second pressure regulating positions intermediate said closed and full flow positions;
(d) full flow bypass means including:
  (1) a full flow bypass valve having an open position communicating said control and outlet chambers and a closed position; and
  (2) a full flow valve actuator selectively moving said full flow bypass valve between the open and closed positions thereof;
(e) first pressure regulating bypass means including:
  (1) a first pressure regulating bypass valve having an open position communicating said control and outlet chambers and a closed position; and
  (2) a first pressure regulating bypass valve actuator selectively moving said first pressure regulating bypass valve between the open and closed positions thereof;
(f) second pressure regulating bypass means including:
  (1) a second pressure regulating bypass valve having an open position communicating said control and outlet chambers and a closed position; and
  (2) a second pressure regulating bypass valve actuator selectively moving said second pressure regulating bypass valve between the open and closed positions thereof;
(g) automatic control means automatically controlling said bypass valve actuators; and (h) said automatic control means includes timer means for sequentially timing the opening and closing of said bypass valve.

8. The invention of claim 7, which includes:
   (a) an inlet manifold communicating said control chamber and said first and second pressure regulating bypass means; and
   (b) an outlet manifold communicating said first and second pressure regulating bypass means and said outlet chamber.

9. The invention of claim 8 wherein said inlet and outlet manifolds include respective inlet and outlet T-connectors connected to said body assembly.

10. The invention of claim 9, which includes:
    (a) a pair of inlet conduits each connecting said inlet T-connector with a respective pressure regulating bypass valve; and
    (b) a pair of outlet conduits each connecting said outlet T-connector with a respective pressure regulating bypass valve.

11. The invention of claim 7 wherein each said bypass valve actuator comprises a solenoid.

12. The invention of claim 7, which includes:
    (a) said body assembly having a valve body with said inlet and outlet chambers and a bonnet with said control chamber.

13. The invention of claim 12 wherein said flow control valve assembly includes:
    (a) a flexible diaphragm gasket mounted between said valve body and said bonnet; and
    (b) said valve member being mounted on said flexible diaphragm gasket.

14. The invention of claim 12, which includes:
    (a) a flow valve member return spring engaging said flow valve member and said bonnet for biasing said flow valve member towards its closed position.

15. The invention of claim 7 wherein said flow valve member includes a valve member stud having:
    (a) an upstream end located in said inlet chamber;
    (b) a downstream end located in said control chamber; and
    (c) a flow valve stud bore open at said flow valve stud upstream end and open in proximity to said flow valve stud downstream end.

16. The invention of claim 15 wherein said body assembly includes a full flow bypass passage selectively, fluidically communicating said control and outlet chambers with said full flow bypass valve in its open position.

* * * * *